US009663363B2

(12) United States Patent
Simmons et al.

(10) Patent No.: US 9,663,363 B2
(45) Date of Patent: May 30, 2017

(54) VARIOUS METHODS AND APPARATUSES FOR MULTI-STAGE SYNTHESIS GAS GENERATION

(75) Inventors: Wayne W. Simmons, Longmont, CO (US); Sidney P. White, Fort Collins, CO (US); Christopher Perkins, Boulder, CO (US)

(73) Assignee: Sundrop Fuels, Inc., Longmont, CO (US)

( * ) Notice: Subject to any disclaimer, the term of this patent is extended or adjusted under 35 U.S.C. 154(b) by 707 days.

(21) Appl. No.: 13/429,794

(22) Filed: Mar. 26, 2012

(65) Prior Publication Data

US 2012/0181483 A1 Jul. 19, 2012

Related U.S. Application Data

(63) Continuation-in-part of application No. 13/254,020, filed as application No. PCT/US2010/059564 on Dec.
(Continued)

(51) Int. Cl.
*C10J 3/62* (2006.01)
*C01B 3/38* (2006.01)
(Continued)

(52) U.S. Cl.
CPC .............. *C01B 3/384* (2013.01); *C10J 3/485* (2013.01); *C10J 3/506* (2013.01); *C10J 3/62* (2013.01);
(Continued)

(58) Field of Classification Search
CPC .. C10J 2300/12; C10J 2300/1246; C10J 3/48; C10J 3/485
(Continued)

(56) References Cited

U.S. PATENT DOCUMENTS 1,508,464 A 9/1924 McFarland
2,237,491 A 4/1941 Kutz
(Continued)

FOREIGN PATENT DOCUMENTS

JP 2002/012877 A 1/2002
SU 1763814 A1 9/1992
(Continued)

OTHER PUBLICATIONS

International Search Report and Written Opinion for International Application No. PCT/US2013/033920 mailed Jun. 14, 2013, 15 pages. International Searching Authority/US, Alexandria Virginia USA.
(Continued)

*Primary Examiner* — Matthew Merkling
(74) *Attorney, Agent, or Firm* — Rutan & Tucker, LLP

(57) ABSTRACT

A multiple stage synthesis gas generation system is disclosed including a high radiant heat flux reactor, a gasifier reactor control system, and a Steam Methane Reformer (SMR) reactor. The SMR reactor is in parallel and cooperates with the high radiant heat flux reactor to produce a high quality syngas mixture for MeOH synthesis. The resultant products from the two reactors may be used for the MeOH synthesis. The SMR provides hydrogen rich syngas to be mixed with the potentially carbon monoxide rich syngas from the high radiant heat flux reactor. The combination of syngas component streams from the two reactors can provide the required hydrogen to carbon monoxide ratio for methanol synthesis. The SMR reactor control system and a gasifier reactor control system interact to produce a high quality syngas mixture for the MeOH synthesis.

1 Claim, 8 Drawing Sheets

Related U.S. Application Data 8, 2010, which is a continuation of application No. 12/795,947, filed on Jun. 8, 2010.

(60) Provisional application No. 61/248,282, filed on Oct. 2, 2009, provisional application No. 61/185,492, filed on Jun. 9, 2009, provisional application No. 61/380,116, filed on Sep. 3, 2010.

(51) Int. Cl.
   *C10J 3/48* (2006.01)
   *C10J 3/50* (2006.01)
   *C10J 3/84* (2006.01)
   *C10K 1/00* (2006.01)

(52) U.S. Cl.
   CPC ............... *C10J 3/84* (2013.01); *C10K 1/003* (2013.01); *C01B 2203/0233* (2013.01); *C01B 2203/061* (2013.01); *C01B 2203/0811* (2013.01); *C01B 2203/1241* (2013.01); *C01B 2203/169* (2013.01); *C10J 2300/0916* (2013.01); *C10J 2300/1223* (2013.01); *C10J 2300/1621* (2013.01); *C10J 2300/1665* (2013.01); *C10J 2300/1853* (2013.01); *Y02E 50/18* (2013.01); *Y02P 20/145* (2015.11); *Y02T 50/678* (2013.01)

(58) Field of Classification Search
   USPC .......................................................... 48/61
   See application file for complete search history.

(56) References Cited

U.S. PATENT DOCUMENTS

| | | | |
|---|---|---|---|
| 4,164,123 A | 8/1979 | Smith | |
| 4,219,492 A | 8/1980 | Konoki et al. | |
| 4,226,795 A | 10/1980 | Bowman | |
| 4,247,755 A | 1/1981 | Smith, Jr. et al. | |
| 4,415,339 A | 11/1983 | Aiman et al. | |
| 4,455,153 A | 6/1984 | Jakahi | |
| 4,552,741 A | 11/1985 | Melchoir | |
| 4,704,137 A | 11/1987 | Richter | |
| 4,756,722 A | 7/1988 | Knop et al. | |
| 4,766,154 A | 8/1988 | Bonnell et al. | |
| 5,179,129 A | 1/1993 | Studer | |
| 5,417,052 A * | 5/1995 | Bharathan et al. | 60/783 |
| 5,496,859 A * | 3/1996 | Fong et al. | 518/703 |
| 5,581,998 A | 12/1996 | Craig | |
| 5,618,500 A | 4/1997 | Wang | |
| 5,647,877 A | 7/1997 | Epstein | |
| 5,906,799 A | 5/1999 | Burgie et al. | |
| 6,402,988 B1 | 6/2002 | Gottzmann et al. | |
| 6,660,244 B2 | 12/2003 | Negishi et al. | |
| 6,676,716 B2 | 1/2004 | Fujimura et al. | |
| 6,767,375 B1 * | 7/2004 | Pearson | 48/111 |
| 6,872,378 B2 | 3/2005 | Weimer et al. | |
| 7,033,570 B2 | 4/2006 | Weimer et al. | |
| 7,207,327 B2 | 4/2007 | Litwin et al. | |
| 7,553,476 B2 | 6/2009 | Marrella et al. | |
| 7,632,476 B2 | 12/2009 | Shah et al. | |
| 7,686,856 B2 | 3/2010 | Hemmings et al. | |
| 7,856,829 B2 | 12/2010 | Shah et al. | |
| 7,871,457 B2 | 1/2011 | Shah et al. | |
| 7,881,825 B2 | 2/2011 | Esposito et al. | |
| 7,931,888 B2 | 4/2011 | Drnevich et al. | |
| 7,985,399 B2 | 7/2011 | Drnevich et al. | |
| 8,007,761 B2 | 8/2011 | Drnevich et al. | |
| 8,378,151 B2 | 2/2013 | Perkins et al. | |
| 2002/0134019 A1 | 9/2002 | Paisley | |
| 2003/0182861 A1 | 10/2003 | Weimer et al. | |
| 2003/0208959 A1 | 11/2003 | Weimer et al. | |
| 2003/0213514 A1 | 11/2003 | Ortabasi | |
| 2004/0170210 A1 | 9/2004 | Do et al. | |
| 2004/0219079 A1 | 11/2004 | Hagen et al. | |
| 2005/0020700 A1 | 1/2005 | Bahnisch | |
| 2005/0142049 A1 | 6/2005 | Amsden et al. | |
| 2006/0024538 A1 | 2/2006 | Steinberg | |
| 2006/0096298 A1 | 5/2006 | Barnicki et al. | |
| 2006/0140848 A1 | 6/2006 | Weimer et al. | |
| 2006/0188433 A1 | 8/2006 | Weimer et al. | |
| 2006/0225424 A1 | 10/2006 | Elliot et al. | |
| 2007/0098602 A1 | 5/2007 | Haueter et al. | |
| 2007/0129450 A1 | 6/2007 | Barnicki et al. | |
| 2007/0225382 A1 | 9/2007 | Van Den Berg et al. | |
| 2008/0025884 A1 | 1/2008 | Tonkovich et al. | |
| 2008/0039674 A1 | 2/2008 | Mason | |
| 2008/0057366 A1 | 3/2008 | Katikaneni et al. | |
| 2008/0086946 A1 | 4/2008 | Weimer et al. | |
| 2008/0104003 A1 | 5/2008 | Macharia et al. | |
| 2008/0209891 A1 | 9/2008 | Johannes et al. | |
| 2008/0222955 A1 | 9/2008 | Jancker et al. | |
| 2008/0223214 A1 | 9/2008 | Palamara et al. | |
| 2008/0284401 A1 | 11/2008 | Oettinger et al. | |
| 2008/0293132 A1 | 11/2008 | Goldman et al. | |
| 2008/0302670 A1 | 12/2008 | Boyle | |
| 2008/0307703 A1 | 12/2008 | Dietenberger et al. | |
| 2009/0013601 A1 | 1/2009 | Mandich et al. | |
| 2009/0014689 A1 | 1/2009 | Klepper et al. | |
| 2009/0018221 A1 | 1/2009 | Klepper et al. | |
| 2009/0018222 A1 | 1/2009 | Klepper et al. | |
| 2009/0018371 A1 | 1/2009 | Klepper et al. | |
| 2009/0018372 A1 | 1/2009 | Tirmizi et al. | |
| 2009/0064578 A1 | 3/2009 | Theegala | |
| 2009/0069452 A1 | 3/2009 | Robota | |
| 2009/0069609 A1 | 3/2009 | Kharas et al. | |
| 2009/0093555 A1 | 4/2009 | Stites et al. | |
| 2009/0151251 A1 | 6/2009 | Manzer et al. | |
| 2009/0151253 A1 | 6/2009 | Manzer et al. | |
| 2009/0156392 A1 | 6/2009 | Kharas | |
| 2009/0156393 A1 | 6/2009 | Kharas | |
| 2009/0156697 A1 | 6/2009 | Kharas | |
| 2009/0313886 A1 | 12/2009 | Hinman | |
| 2009/0318573 A1 | 12/2009 | Stites et al. | |
| 2010/0000874 A1 | 1/2010 | Hinman | |
| 2010/0022806 A1 | 1/2010 | Meitzner | |
| 2010/0075837 A1 | 3/2010 | Meitzner et al. | |
| 2010/0076228 A1 | 3/2010 | Alsum et al. | |
| 2010/0099925 A1 | 4/2010 | Kharas | |
| 2010/0099926 A1 | 4/2010 | Kharas | |
| 2010/0099927 A1 | 4/2010 | Kharas | |
| 2010/0137459 A1 | 6/2010 | Stites et al. | |
| 2010/0152497 A1 | 6/2010 | Stites | |
| 2010/0152498 A1 | 6/2010 | Kharas et al. | |
| 2010/0210741 A1 | 8/2010 | Kharas | |
| 2010/0212220 A1 | 8/2010 | Tirmizi | |
| 2010/0237291 A1 | 9/2010 | Simmons | |
| 2010/0240780 A1 | 9/2010 | Holcombe | |
| 2010/0242352 A1 | 9/2010 | Perkins et al. | |
| 2010/0242353 A1 | 9/2010 | Jovanovic | |
| 2010/0242354 A1 | 9/2010 | Perkins et al. | |
| 2010/0243961 A1 | 9/2010 | Hilton et al. | |
| 2010/0247387 A1 | 9/2010 | Perkins et al. | |
| 2010/0249251 A1 | 9/2010 | Hilton et al. | |
| 2010/0249468 A1 | 9/2010 | Perkins et al. | |
| 2010/0270505 A1 | 10/2010 | Gallaspy et al. | |
| 2010/0273899 A1 | 10/2010 | Winter | |
| 2010/0280287 A1 | 11/2010 | Kharas et al. | |
| 2010/0303692 A1 | 12/2010 | Perkins et al. | |
| 2010/0331581 A1 | 12/2010 | Kharas et al. | |
| 2011/0107661 A1 | 5/2011 | Tirmizi et al. | |
| 2011/0107662 A1 | 5/2011 | Tirmizi et al. | |
| 2011/0107663 A1 | 5/2011 | Tirmizi et al. | |
| 2011/0124927 A1 | 5/2011 | Stites et al. | |
| 2011/0155958 A1 | 6/2011 | Winter et al. | |
| 2011/0218254 A1 | 9/2011 | Chakravarti et al. | |
| 2011/0301732 A1 | 12/2011 | Gao et al. | |
| 2012/0145965 A1 | 6/2012 | Simmons et al. | |
| 2012/0181483 A1 | 7/2012 | Simmons | |
| 2012/0241677 A1 | 9/2012 | Perkins | |

(56) References Cited

U.S. PATENT DOCUMENTS

FOREIGN PATENT DOCUMENTS

| WO | WO 2011/155962 A1 | 12/2011 |
| WO | WO 2013/158343 A1 | 10/2013 |

OTHER PUBLICATIONS

Notification Concerning Transmittal of International Preliminary Report on Patentability for International Application No. PCT/US2010/059564, mailed Dec. 20, 2012, 10 pages, The International Bureau of WIPO, Geneva, Switzerland.

International Search Report and Written Opinion for International Application No. PCT/US2010/059564, mailed Mar. 2, 2011, 11 pages, International Searching Authority/US, Alexandria Virginia USA.

Bridgwater, et al., "Fast Pyrolysis Processes for Biomass" Renewable and Sustainable Energy Reviews, vol. 4, No. 1, pp. 1-73, Mar. 2000.

Lede, "Solar Thermochemical Conversion of Biomass", Solar Energy, vol. 65, No. 1, 11 pages, Jan. 1, 1999.

Restriction Requirement for U.S. Appl. No. 13/254,020 mailed Nov. 26, 2012, 6 pages. U.S. Patent and Trademark Office, Alexandria Virginia USA.

Non-Final Office Action for U.S. Appl. No. 13/254,020 mailed May 9, 2013, 21 pages. U.S. Patent and Trademark Office, Alexandria Virginia USA.

Restriction Requirement for U.S. Appl. No. 12/795,947 mailed Oct. 9, 2012, 5 pages. U.S. Patent and Trademark Office, Alexandria Virginia USA.

Non-Final Office Action for U.S. Appl. No. 13/254,020 mailed Mar. 14, 2013, 25 pages. U.S. Patent and Trademark Office, Alexandria Virginia USA.

*Netscape Communications Corp. v. ValueClick, Inc.,* 684 F. Supp. 2d. 678—Dist. Court, ED Virginia 2010. No. 1:09cv225. United States District Court, E.D. Virginia, Alexandria Division. Oct. 22, 2009. 38 pages.

*Ex Parte Wada and Murphy,* U.S. Patent and Trademark Office Board of Patent Appeals and Interferences Decision on Appeal dated Jan. 14, 2008, 9 pages.

*Ex Parte Chapman,* U.S. Patent and Trademark Office Board of Patent Appeals and Interferences Decision on Appeal dated Feb. 9, 2012 for Appeal No. 2009-010238, U.S. Appl. No. 10/751,616, 6 pages.

Munzinger, M., et al., "Biomass Gassification Using Solar Thermal Energy", Anzses 2006, pp. 1-10.

Mishra, Anuradha, et al., "Thermal Optimization of Solar Biomass Hybrid Cogeneration Plants", Journal of Scientific & Industrial Research, vol. 65, Apr. 2006, pp. 355-363.

Esser, Peter, et al., "The Photochemical Synthesis of Fine Chemicals With Sunlight," Angew. Chem. Int. Ed. Engl. 1994, vol. 33, pp. 2009-2023.

Non-Final Office Action for U.S. Appl. No. 13/429,749 mailed Dec. 24, 2013, 14 pages. U.S. Patent and Trademark Office, Alexandria Virginia USA.

Notice of Allowance for U.S. Appl. No. 13/429,749 mailed Apr. 15, 2014, 18 pages. U.S. Patent and Trademark Office, Alexandria Virginia USA.

Final Office Action for U.S. Appl. No. 13/254,020 mailed Oct. 29, 2013, 23 pages. U.S. Patent and Trademark Office, Alexandria Virginia USA.

Advisory Action for U.S. Appl. No. 13/254,020 mailed Mar. 17, 2014, 4 pages. U.S. Patent and Trademark Office, Alexandria Virginia USA.

Search Report and Written Opinion for International Application No. PCT/US2010/037940 mailed Aug. 13, 2010, 11 pages. International Searching Authority/US, Alexandria, Virginia US.

International Preliminary Report on Patentability for International Application No. PCT/US2010/037940 mailed Dec. 22, 2011, 10 pages. The International Bureau of WIPO, Geneva, Switzerland.

Office Action for Chinese Patent Application No. 201080025216.3 mailed Mar. 27, 2014, 9 pages State Intellectual Property Office of the PRC.

Office Action for Chinese Patent Application No. 201080025216.3 mailed Jun. 20, 2013, 5 pages State Intellectual Property Office of the PRC.

Advisory Action for U.S. Appl. No. 12/795,947 mailed Jan. 21, 2014, 4 pages. U.S. Patent and Trademark Office, Alexandria Virginia USA.

Final Office Action for U.S. Appl. No. 12/795,947 mailed Oct. 2, 2013, 26 pages. U.S. Patent and Trademark Office, Alexandria Virginia USA.

Non-Final Office Action for U.S. Appl. No. 13/254,020 mailed Jun. 16, 2014, 28 pages. U.S. Patent and Trademark Office, Alexandria Virginia USA.

Notice of Allowance for U.S. Appl. No. 13/254,020 mailed Dec. 3, 2014, 7 pages. U.S. Patent and Trademark Office, Alexandria Virginia USA.

International Preliminary Report on Patentability for International Application No. PCT/US2013/033920 mailed Oct. 1, 2014, 26 pages. The International Bureau of WIPO, Geneva, Switzerland.

Non-Final Office Action for U.S. Appl. No. 12/795,947 mailed Jun. 3, 2014, 30 pages. U.S. Patent and Trademark Office, Alexandria Virginia USA.

Non-Final Office Action for U.S. Appl. No. 12/795,947 mailed Sep. 15, 2014, 31 pages. U.S. Patent and Trademark Office, Alexandria Virginia USA.

\* cited by examiner

US 9,663,363 B2

VARIOUS METHODS AND APPARATUSES FOR MULTI-STAGE SYNTHESIS GAS GENERATION

RELATED APPLICATIONS

This application claims the benefit of and is a continuation in part of U.S. application Ser. No. 13/254,020, filed 31 Aug. 2011 and entitled "VARIOUS METHODS AND APPARATUSES FOR AN ULTRA-HIGH HEAT FLUX CHEMICAL REACTOR" which claims the benefit of and was a U.S. national stage application under 35 USC §371 of PCT Application number PCT/US10/59564, filed 8 Dec. 2010 and entitled "VARIOUS METHODS AND APPARATUSES FOR AN ULTRA-HIGH HEAT FLUX CHEMICAL REACTOR," which claims the benefit of both 1) patent application Ser. No. 12/795,947, filed Jun. 8, 2010 and entitled "SYSTEMS AND METHODS FOR AN INDIRECT RADIATION DRIVEN GASIFIER REACTOR & RECEIVER CONFIGURATION," which claims the benefit of both U.S. Provisional Patent Application Ser. No. 61/248,282, filed Oct. 2, 2009 and entitled "Various Methods and Apparatuses for Sun Driven Processes," and U.S. Provisional Patent Application Ser. No. 61/185,492, titled "VARIOUS METHODS AND APPARATUSES FOR SOLAR-THERMAL GASIFICATION OF BIOMASS TO PRODUCE SYNTHESIS GAS" filed Jun. 9, 2009, and 2) U.S. Provisional Patent Application Ser. No. 61/380,116, filed Sep. 3, 2010 and entitled "HIGH HEAT FLUX CHEMICAL REACTOR."

BACKGROUND

Natural gas or liquid propane gas (LPG) may be used with steam in a steam methane reforming (SMR) reaction. Methanol is a chemical with formula $CH_3OH$ (often abbreviated MeOH). It is the simplest alcohol, and is a flammable fuel and can be stored as a liquid at normal temperatures. Methanol can be synthesized from syngas and then turned into gasoline using a Methanol-to-Gasoline process. Biomass may be gasified in a gasifier. However, when ashes and other solid particles from a gasifier are sent to a SMR, then that process tends to plug up the SMR.

SUMMARY

A multiple stage synthesis gas generation system is disclosed including a high radiant heat flux reactor, a gasifier reactor control system, and a Steam Methane Reformer (SMR) reactor. The SMR reactor is in parallel and cooperates with the high radiant heat flux reactor to produce a high quality syngas mixture for MeOH synthesis. The resultant products from the two reactors may be used for the MeOH synthesis. The SMR provides hydrogen rich syngas to be mixed with the potentially carbon monoxide rich syngas from the high radiant heat flux reactor. The combination of syngas component streams from the two reactors can provide the required hydrogen to carbon monoxide ratio for methanol synthesis. The SMR reactor control system and a gasifier reactor control system interact to produce a high quality syngas mixture for the MeOH synthesis.

BRIEF DESCRIPTION OF THE DRAWINGS

The multiple drawings refer to the example embodiments of the invention.

Figure 1:
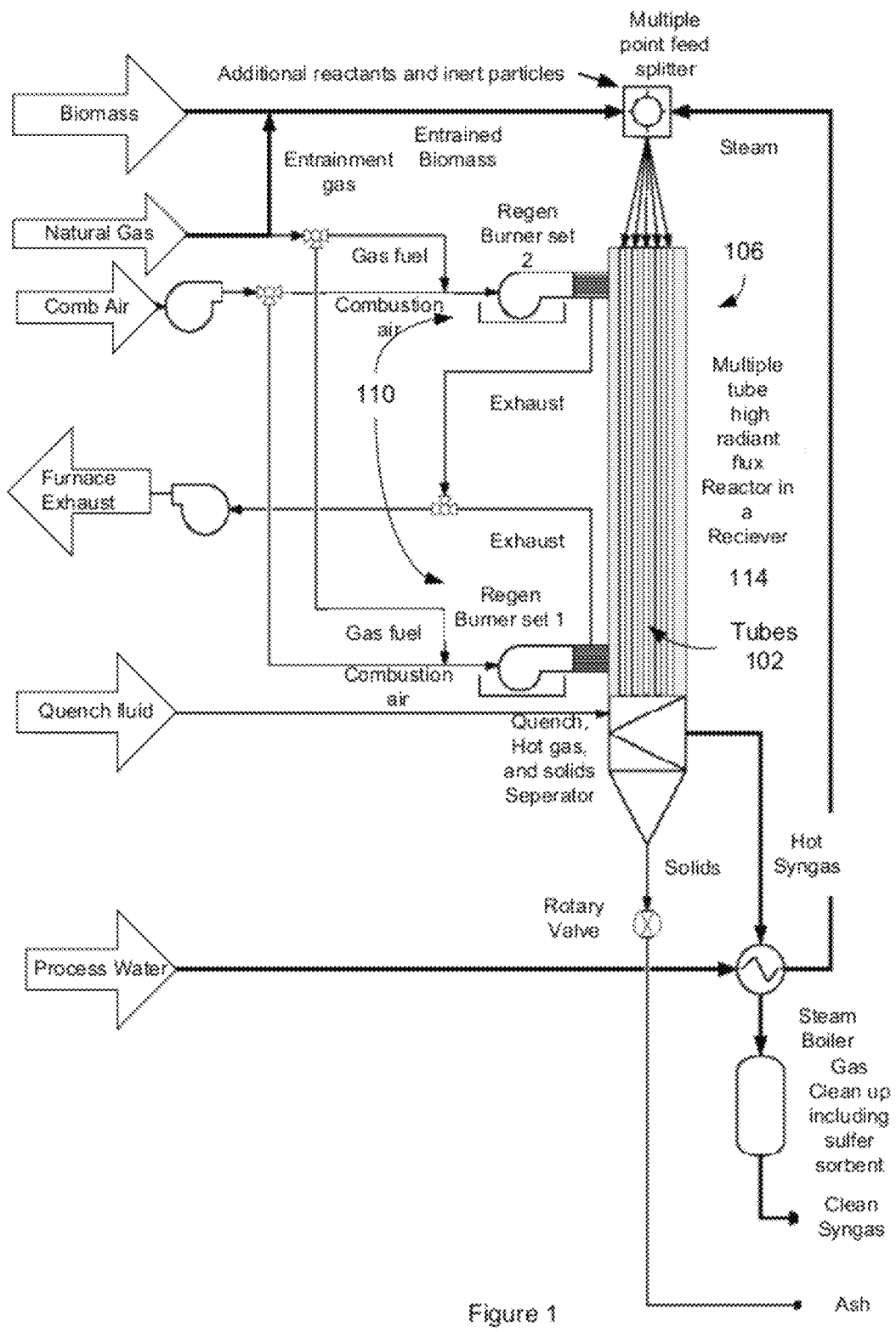
FIG. 1 illustrates a flow schematic of an embodiment for the high-radiant heat-flux chemical reactor implemented for biomass gasification using regenerative natural gas burners as a heat source.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific chemicals, named components, connections, types of heat sources, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

A number of example processes for and apparatuses associated with a high-radiant heat-flux reactor and its associated integrated chemical plant are described. The following drawings and text describe various example implementations of the design. A multiple stage synthesis gas generation system may include a high-radiant heat-flux reactor and a Steam Methane Reformer (SMR) reactor. The high-radiant heat-flux reactor is configured to receive biomass particles that undergo a biomass gasification reaction in the reactor at greater than 950 degrees C., via primarily due to the radiant heat emitted from the high-radiant heat-flux reactor, to produce reactant products including ash as well as syngas products of hydrogen and carbon monoxide coming out of an exit of the high-radiant heat-flux reactor. The SMR reactor is configured to receive a methane-based gas. The SMR reactor is in parallel to and cooperates with the high-radiant heat-flux reactor to produce a high quality syngas mixture for methanol synthesis between the resultant reactant products coming from the two reactors. The SMR provides 1) hydrogen gas, 2) a hydrogen-rich syngas composition, in which a ratio of hydrogen-to-carbon monoxide is higher than a ratio generally needed for methanol synthesis and 3) any combination of the two. The hydrogen rich syngas composition is mixed with a potentially carbon monoxide rich syngas composition, in which a ratio of carbon monoxide to hydrogen is higher than the ratio generally needed for methanol synthesis, from the high-radiant heat-flux reactor to provide a required hydrogen-to-carbon monoxide ratio for methanol synthesis. A common input into a methanol-synthesis-reactor-train coupled downstream of the SMR reactor and the high-radiant heat-flux reactor is configured to receive a first stream of the syngas components from the SMR reactor and a separate second stream of the syngas components from the high-radiant heat-flux reactor. The SMR reactor control system interacts with the gasifier reactor control system based on the chemical composition feedback from the chemical sensors to produce a high quality syngas mixture for methanol synthesis. The high-radiant heat-flux reactor is one example type of biomass gasifier that may be used. One skilled in the art will understand parts and aspects of many of the designs discussed below within this illustrative document may be used as stand-alone concepts or in combination with each other.

FIG. 1 illustrates a flow schematic of an embodiment for the high-radiant heat-flux chemical reactor implemented for biomass gasification using regenerative natural gas burners as a heat source.

The high-radiant heat-flux reactor 114 has at least a biomass particle feed system, a steam supply inlet, one or more regenerative heaters, a first set of sensors to measure a chemical composition of produced product gases from the high-radiant heat-flux reactor, and a gasifier reactor control system. The high-radiant heat-flux reactor 114 has a downdraft geometry with the multiple reactor tubes 102 in a vertical orientation located inside the cavity of the thermal receiver 106. A chemical reaction driven by radiant heat occurs within the multiple reactor tubes 102. Thus, the high-radiant heat-flux reactor includes two or more vertically orientated tubes 102 within the high-radiant heat-flux reactor. The biomass particles flow inside the tubes 102 and the one or more regenerative heaters and surfaces of high-radiant heat-flux reactor itself emit radiant heat to the outside of the two or more tubes 102. (See FIG. 5 for an alternative biomass to tube flow arrangement) The cavity is made of highly reflective material that distributes radiant energy and, the receiver 106 encloses multiple reactor tubes 102 of the ultra-high heat flux high-radiant heat-flux reactor 114. The reactor tubes 102 may be configured to pass multiple chemical reactants including 1) methane 2) natural gas, 3) steam 4) biomass particles and 5) any combination of the four, through the tubes to cause a steam methane reaction and a gasification of the biomass particles using the thermal energy from the radiant energy.

The high-radiant heat-flux reactor 114 is driven primarily by radiative heat transfer, and not convection or conduction. Thus, radiative heat transfer drives the high heat flux. Typical gas chemical reactors use convection or conduction to transfer energy, and these have effective heat transfer coefficients between 20 W/m^2 and 100 W/m^2, giving effective heat transfer fluxes below 10 kW/m^2 (for up to a 100° C. driving temperature difference). The high radiant heat flux biomass gasifier will use heat fluxes significantly greater, at least three times the amount, than those found in convection driven biomass gasifiers (i.e. greater than 25 kW/m^2). Generally, using radiation at high temperature (>950 degrees C. wall temperature), much higher fluxes (high heat fluxes greater than 80 kW/m^2) can be achieved with the properly designed reactor. In some instances, the high heat fluxes can be 100 kW/m^2-250 kW/m^2. For heat transfer limited reactions, the size of capital equipment is reduced linearly with the flux, and capital cost is greatly reduced. Typical chemical reactors, all driven by convection and/or conduction, simply cannot achieve these flux rates or size of process equipment.

The gas-fired regenerative burners 110 under the direction of the reactor's control system supply heat energy to the high-radiant heat-flux reactor 114. The inside wall of the receiver 106 absorbs or highly reflects the concentrated energy from the regenerative burners 110 positioned along the walls of the receiver 106 cavity to cause energy transport by thermal radiation and reflection to generally convey that heat flux to the biomass particles inside the walls of the reactor tubes. The receiver 106 inner wall absorbs or highly reflects the regenerative burners 110 to cause a radiant heat and then generally radiatively transmits that heat to the biomass particles in the tubes of the solar driven high-radiant heat-flux reactor 114. An inner wall of the receiver 106 cavity may be made of material to allow the receiver 106 cavity to be operated at high, >1200 degrees C., wall temperatures to enable the high heat transfer rates, rapid reaction kinetics of the very short residence time, and high selectivity of carbon monoxide and hydrogen produced from the gasification reaction for syngas.

Figure 2A:
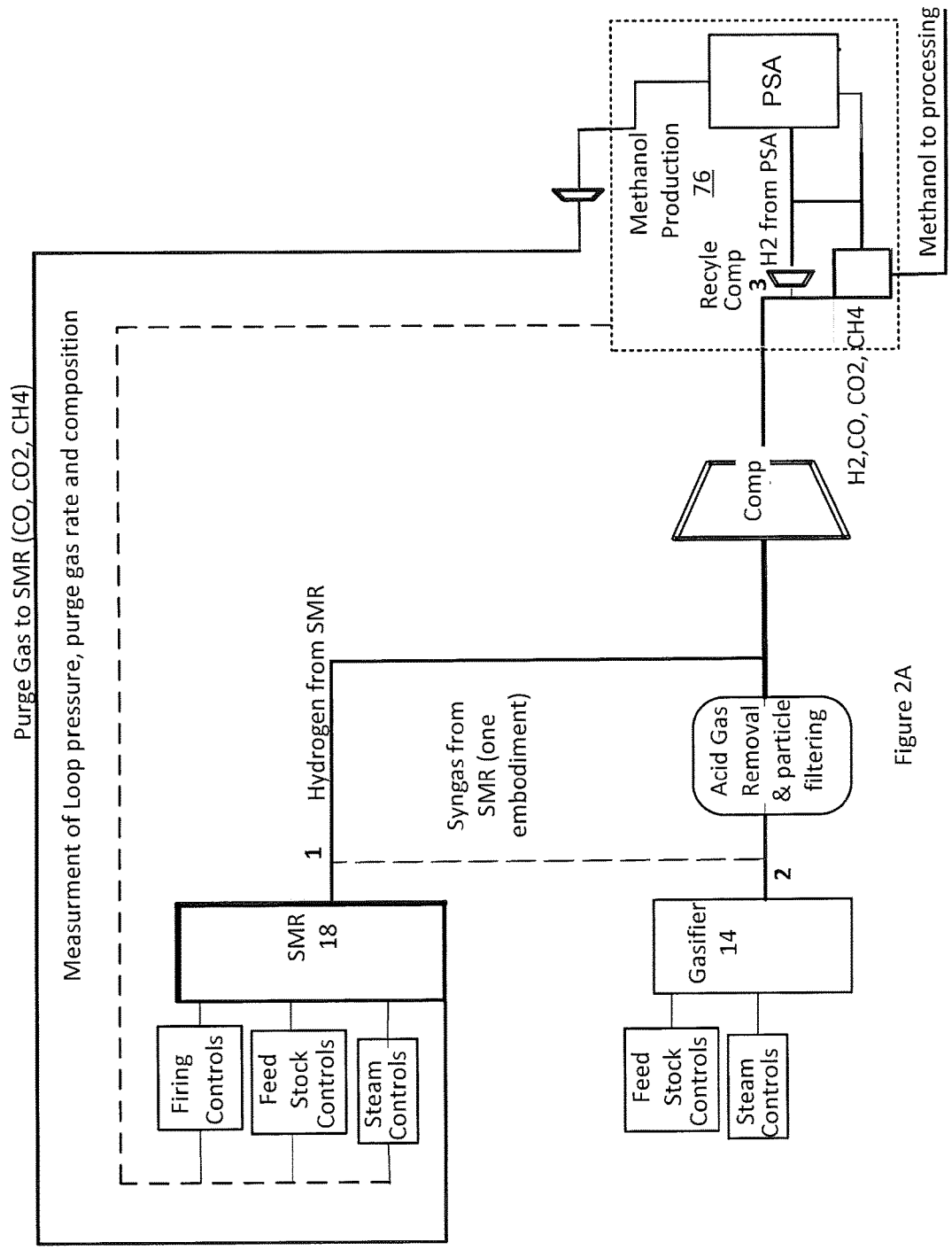
FIG. 2A illustrates a block diagram of an embodiment of an example multi-stage synthesis gas generation system.

FIG. 2A illustrates a block diagram of an embodiment of an example multi-stage synthesis gas generation system. A SMR reactor 18 is in parallel to and cooperates with a high-radiant heat-flux reactor 14 that gasifies biomass and the resultant reactant products coming from the two reactors combine to produce a high quality syngas mixture for methanol synthesis. The SMR reactor 18 provides either 1) hydrogen, 2) a hydrogen-rich syngas composition, in which a ratio of hydrogen-to-carbon monoxide is higher than a ratio generally needed for methanol synthesis, and 3) any combination of the two, to be mixed with a potentially carbon-monoxide-rich syngas composition, in which a ratio of carbon monoxide to hydrogen is higher than the ratio generally needed for methanol synthesis, from the high-radiant heat-flux reactor 14 to provide a required hydrogen-to-carbon monoxide ratio for methanol synthesis. Flow of reactants through the SMR reactor 18 is used to dynamically control the hydrogen-to-carbon monoxide ratio supplied to the methanol-synthesis-reactor-train 76 while trying to maintain flow of reactants in the high-radiant heat-flux reactor relatively steady. Note, the SMR reactor 18 includes a standard catalytic SMR reactor as well a thermal SMR reactor. The thermal SMR reactor raises the temperature to above 1200 degrees C. to decompose the CH4 methane into H2 and coke. The SMR reactor than exposes the coke to steam H2O to gasify the coke and create additional syngas components of CO and H2. Coke is the solid carbonaceous material derived from the decomposing of the methane gas.

When the SMR reactor 18 is mainly producing H2 gas then its three way valve routes H2 gas and other components to be combined with the syngas components from the high-radiant heat-flux reactor 14 after the acid gas removal and particle filtering steps. When the SMR reactor 18 is mainly producing syngas components then its three way valve routes this first stream of syngas components to be combined with a second stream of syngas components from the high-radiant heat-flux reactor 14 to be processed in the acid gas removal, heat removal, potentially particle filtering, and compression steps.

The common input into a methanol-synthesis-reactor-train 76 is coupled downstream of the SMR reactor 18 and the high-radiant heat-flux reactor 14. The common input into a methanol-synthesis-reactor-train 76 is configured to receive a first stream of 1) H2 gas, 2) H2, CO, CO2 gases, and any combination of these two, syngas components from the SMR reactor 18 and the separate second stream of the syngas components from the high-radiant heat-flux reactor 14. One or more control systems monitor a chemical composition feedback signal of the first stream of the syngas components and the second stream of the syngas components from one or more sensors to produce a high quality syngas mixture for methanol synthesis. The gasifier reactor control system and the SMR control system may be part of the one or more control systems.

The methanol-synthesis-reactor-train 76 produces methanol from the received syngas components. A purge gas line from the methanol-synthesis-reactor-train 76 sends gases including CO, CO2, and CH4 over to the input of the SMR reactor 18. A feedback loop from the methanol-synthesis-reactor-train 76 provides a measurement of loop pressure, purge gas rate, and composition to the one or more control systems.

The purge gas line may also initially contain large amounts of H2 gas. The gasifier reactor control system and the SMR control system interact to control an amount of hydrogen and carbon monoxide gases supplied to the methanol-synthesis-reactor-train 76 to achieve a proper hydrogen/carbon monoxide ratio for methanol synthesis from 1) the first stream of the syngas components from the SMR reactor 18, 2) the separate second stream of the syngas components from the high-radiant heat-flux reactor 14, and 3) a flow of hydrogen gas from a recycle loop off a purge gas line coming out of the methanol-synthesis-reactor-train 76, and any of these three sources are mixed together prior to feeding the syngas at the proper ratio into the methanol-synthesis-reactor-train 76. Thus, the methanol reactor train 76 is configured to receive syngas components at the common input from three sources 1) synthesis gas from a SMR reactor 18, 2) synthesis gas from the high-radiant heat-flux reactor 14, and 3) a flow of hydrogen gas from a recycle loop off a purge gas line coming out of the methanol-synthesis-reactor-train 76.

The methane contained in the purge gas line of the methanol-synthesis-reactor-train 76 is routed as a feedstock to the SMR reactor 18. The methane may be produced in the biomass gasification reaction in the high-radiant heat-flux reactor 14 and carried through the methanol production process, 2) was simply part of the entrainment gas carrying the biomass particles being fed into the high-radiant heat-flux reactor 14 and was carried through the methanol production process, or 3) in some other way was present during the biomass gasification reaction.

The proper hydrogen-to-carbon monoxide ratio of synthesis gas necessary for high quality methanol synthesis may be 2.0:1 to 3.0:1 hydrogen-to-carbon monoxide ratio, and preferably 2.3 to 3.0 to 1. The proper hydrogen-to-carbon monoxide ratio causes a greater overall conversion of carbon monoxide into methanol, and a per pass through the methanol synthesis train conversion of 50% or more of the carbon monoxide into methanol.

Figure 2B:
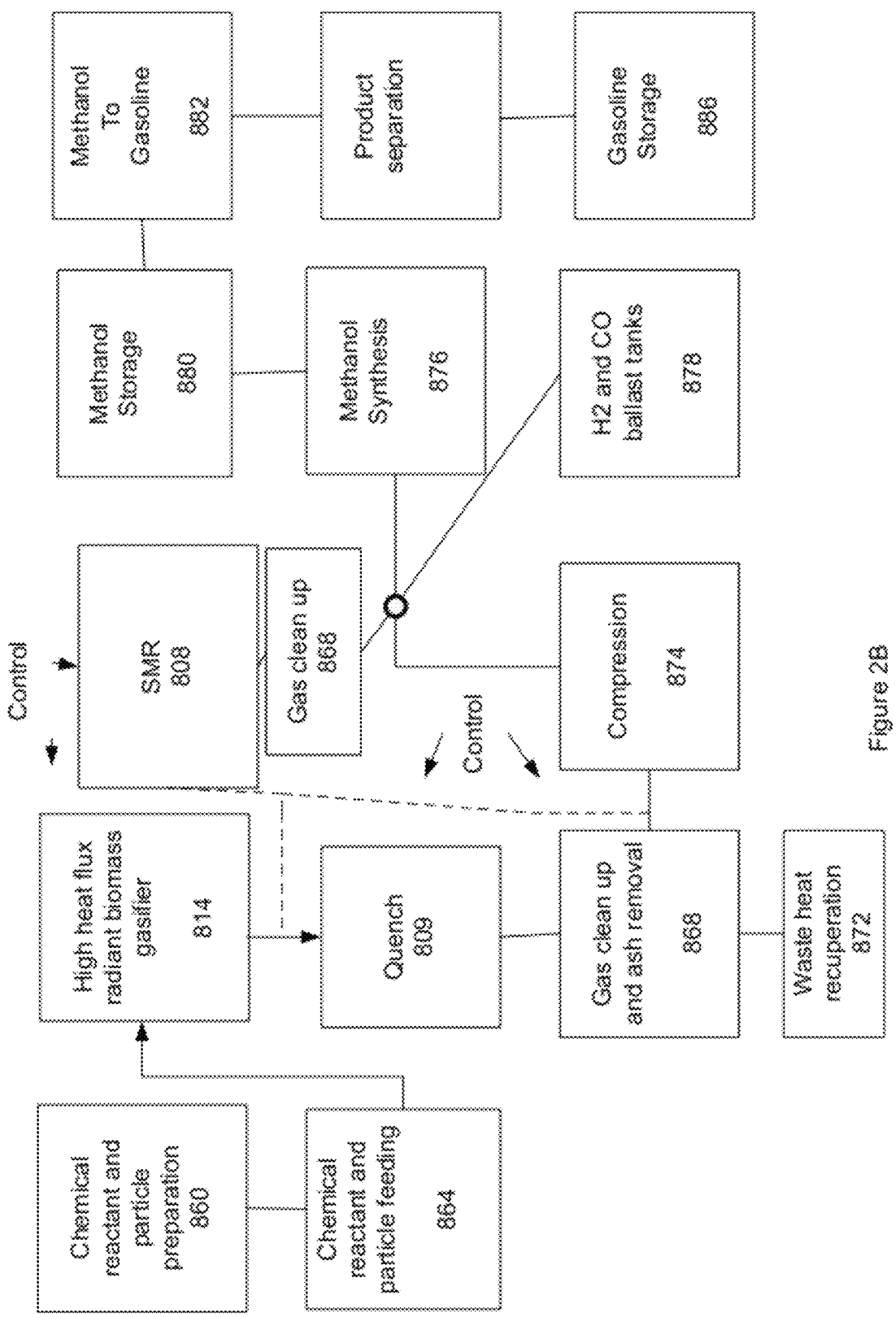
FIG. 2B illustrates a block diagram of an embodiment of an example integrated process flow for the multi-stage synthesis gas generation system with its high-radiant heat-flux reactor, a Steam Methane Reformer reactor, and the associated plant.
Figure 2C:
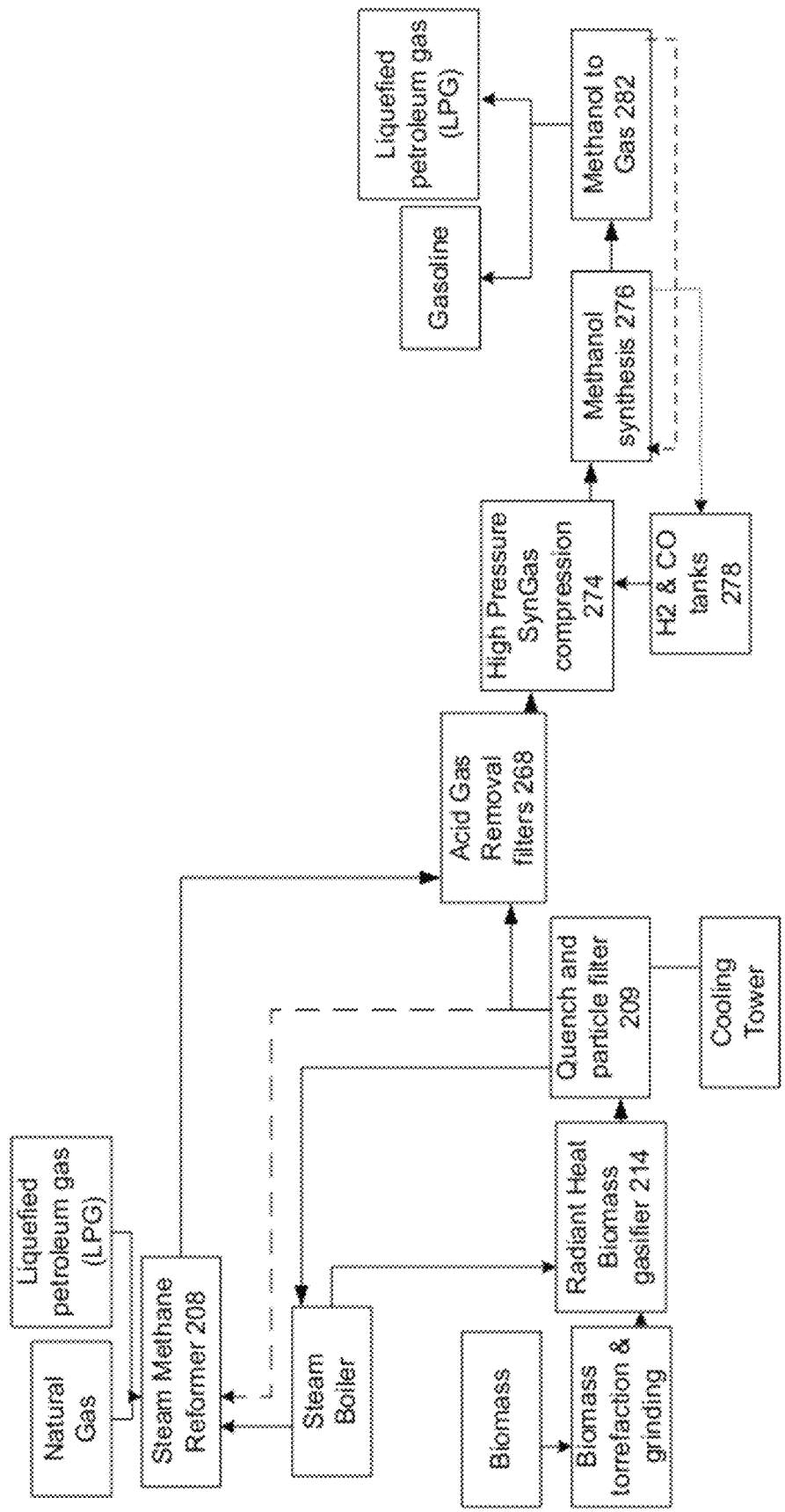
FIG. 2C illustrates a block diagram of another embodiment of an example multi-stage synthesis gas generation system.

FIG. 2C illustrates a block diagram of an embodiment of an example high radiant heat flux reactor and its design and the cooperating SMR reactor to make up a multiple stage synthesis gas generation. The Steam Methane Reformer (SMR) reactor 208 may at least have a methane-based gas feed system, a steam supply inlet, a second set of sensors to measure a chemical composition of produced product gases from the SMR, and a SMR control system. The SMR reactor 208 can be used in parallel and cooperating with the high-radiant heat-flux reactor 214 to produce a high quality syngas mixture for MeOH synthesis between the resultant products from the two reactors. The SMR 208 may provide a hydrogen rich syngas composition, in which a ratio of hydrogen-to-carbon monoxide is higher than a ratio generally needed for methanol synthesis, to be mixed with a potentially carbon monoxide rich syngas composition, in which a ratio of carbon monoxide to hydrogen is higher than the ratio generally needed for methanol synthesis, from the high-radiant heat-flux reactor 214 to provide a required hydrogen-to-carbon monoxide ratio for methanol synthesis. Note, methane-based gases, such as natural gas or LPG gas, can be provided as feedstock to the SMR 208, fuel for the heaters of the high-radiant heat-flux reactor and potentially the heaters of the steam boilers, as well as potentially as the carrier gas for the biomass particles. The SMR 208 receives the natural gas (CH4) adds H2O in the form of superheated steam from the boiler which yields carbon monoxide (CO) and hydrogen (H2) in generally a 3 moles of H2 for each mole of CO produced. Sometimes the endothermic steam reformation of methane can be (4-CH4+O2+2H2O+energy→10H2+4CO) or (CH4+CO2+H2O+energy→2H2+2CO+H2O). In parallel, the high-radiant heat-flux reactor 214 receives biomass particles, such as a softwood with an example cellulose composition of C6H10O5 and example lignin composition of C10H12O3 adds superheated steam (H2O), and possibly heat transfer aid particles as a feedstock to generate large amounts of CO and H2. The syngas composition made up of CO and H2 from the biomass gasifier goes through a gas clean up section to cool, pressurize, and remove any ash and other solids and any harmful gases such as Hydrogen Sulfide and/or excess Carbon Dioxide (from the amount needed for methanol production) from the syngas to a methanol synthesis reactor (CH3OH). The syngas composition made up of CO and H2 from the SMR reactor 208 goes directly through a gas clean up section to potentially cool, pressurize, and remove harmful gases from the syngas to the methanol synthesis reactor (CH3OH).

Note, a recycle loop is in place to route methane (CH4) either 1) generated in the biomass gasification or 2) merely present in the biomass gasification reaction in the high-radiant heat-flux reactor 214 and 3) any combination of the two, over to the SMR reactor 208 from the exit of high-radiant heat-flux reactor after a quench and a particle control device 209 removes any ash and other solids in a gas stream exiting the high-radiant heat-flux reactor 208. The particle control device may include a particle filter, centrifugal force component, any similar method to remove particles from a gas, and any combination of the three. The syngas composition made up of carbon monoxide and hydrogen exiting from the high-radiant heat-flux reactor flows to a quench and particle filter 209 to remove any ash and other solids in the second stream of the syngas components from the high-radiant heat-flux reactor. A first portion but not all of the syngas from the high-radiant heat-flux reactor 214 is fed into the SMR reactor 208 to react 1) any methane produced by the biomass gasification reaction in the high-radiant heat-flux reactor or 2) react any methane simply part of the biomass particles being fed into the high-radiant heat-flux reactor 214 that is contained in the first portion of syngas components supplied to the SMR reactor 208 from the high-radiant heat-flux reactor 214. The gasifier reactor control system controls an amount of the first portion routed to the SMR 208 to ensure the quality of the syngas being fed into the methanol-synthesis-reactor-train 276. The other second portion of the syngas components from the high-radiant heat-flux reactor 214 is fed further into a gas clean up section to further cool the gas products, filter 268 out harmful contaminant gases including sulfur compounds, and compress 274 to increase the pressure of the syngas components in the second stream for feeding into the common input for the methanol-synthesis-reactor-train 276.

In an embodiment, the gasifier reactor control system and the SMR control system interact to alter a flow of the biomass particles through the high-radiant heat-flux reactor much more gradually than an altering of a flow of the methane-based gas through the SMR reactor 208. Thus, generally the SMR control system is configured to throttle a flow of the methane-based gas and steam as reactants in the SMR reactor to use as a coarse control to maintain the proper ratio of hydrogen-to-carbon monoxide for methanol synthesis while keeping the flow of biomass particles entrained in a carrier gas steady through the high-radiant heat-flux reactor 214. However, the gasifier reactor control system can also vary the amount of biomass fed into the high-radiant heat-flux reactor 214 to the carrier gas volume to control the output syngas composition while trying to keep temperature in specific range; but, the rate of change is slower in the high-radiant heat-flux reactor 214 than in the SMR 208.

The multiple stage synthesis gas generation system has the stream of SMR syngas and the stream of biomass syngas meet and mix prior to being fed into the methanol-synthesis-reactor-train 276. A common input into a methanol-synthesis-reactor-train 276 coupled downstream of the SMR reactor 208 and the high-radiant heat-flux reactor 214 is configured to receive a first stream of the syngas components from the SMR reactor 208 and a separate second stream of the syngas components from the high-radiant heat-flux reactor 214. The two reactors' control systems interact based on the chemical composition feedback from the first and second set of sensors at the outlet of the two reactors to produce a high quality syngas mixture for methanol synthesis.

In some embodiments, the common input into the methanol-synthesis-reactor-train is also configured to receive gases from ballast type tanks 278 that supply and store H2 and CO gases in the tanks. The H2 and CO supply tanks may inject their respective gas in order to rapidly compensate for small surges in the syngas composition and overall keep the SMR flows and Biomass flows with lower rate changes. Thus, the gasifier reactor control system and the SMR control system interact to inject a flow of 1) hydrogen gas, 2) carbon monoxide gas, and 3) any of the two from the ballast tanks 278 as fine tuning control over the ratio of hydrogen-to-carbon monoxide being fed to the methanol-synthesis-reactor-train 276. The multiple stage synthesis gas generation system may use any combination of the hydrogen rich syngas components from the SMR 208, carbon monoxide rich syngas components from the high-radiant heat-flux reactor 214, and pure CO or H2 gas from the ballast tanks 278.

1) The first stream of the syngas components from the SMR reactor 208, 2) the separate second stream of the syngas components from the high-radiant heat-flux reactor 214 and 3) the flow of hydrogen gas, carbon monoxide gas, and any of the two injected from the ballast tanks 278 is mixed prior to feeding the syngas at the proper ratio into the methanol-synthesis-reactor-train 276. Thus, the methanol reactor train is configured to receive syngas components at the common input from three sources 1) synthesis gas from a SMR reactor 208, 2) synthesis gas from the high-radiant heat-flux reactor 214, and 3) hydrogen gas or carbon monoxide gas from small storage tanks 278. The SMR reactor control system and the gasifier reactor control system interact to control a chemical composition of a combined gas stream from the three sources necessary to achieve a proper hydrogen-to-carbon monoxide ratio of synthesis gas composition feed necessary for high quality methanol synthesis, which is a 2:1 to 3:1 hydrogen-to-carbon monoxide ratio, with a preferred range of 2.3 to 3:1.

The SMR's 208 design can include a heat transfer aid for the reactions in the SMR reactor 208. The heat transfer aids may be one or more of the following: a fluidized bed or entrained flow of biomass particles, a fluidized bed or entrained flow of chemically inert particles, a ceramic monolith, ceramic tubes or aerogels, open structured packed rings including Raschig rings, reticulate porous ceramic (RPC) foam, gauze or wire constructed of a high temperature-resistant material, and any combination of these. In the SMR 208, a catalytic lining/coating may aid reaction kinetics. Note, in the biomass gasifier design, metal gauze materials may also be used for transferring radiant heat in the gasifier tube.

An additional aspect of an example embodiment is the 1) coupling of the biomass gasifier producing syngas eventually to a downstream Methanol-to-Gas (MTG) plant 282 via the methanol synthesis reactor 276 and 2) modifying that MTG process to recoup excess and waste methanol back into the downstream methanol-synthesis-reactor-train 276. The MTG plant 282 has a recirculation pipe to recoup methanol back into the downstream process. The MTG process is modified by bypassing or removing the methanol recovery section from the MTG process and piping the excess methanol/non-converted methanol directly back into the methanol synthesis reactor. Thus, excess methanol from the MTG process is piped directly from recirculation pipe to the methanol-synthesis-reactor-train 276. The MTG plant 282 produces both LPG and a finished gasoline product derived from the biomass particles fed into the high-radiant heat-flux reactor 214 and the methane-based gas fed into the SMR 208.

In an embodiment, the on-site fuel synthesis reactor, such as the MTG plant a diesel fuel plant, etc, is geographically located on a same site as the high-radiant heat-flux reactor and the SMR reactor. Additionally, the on-site fuel synthesis reactor is coupled downstream to receive the methanol products from the methanol-synthesis-reactor-train 276 and use them in a hydrocarbon fuel synthesis process to create a liquid hydrocarbon fuel having an octane rating greater than 85 based on the quality of the methanol produced from the syngas components supplied to the methanol-synthesis-reactor-train. The on-site fuel synthesis reactor may be connected to the rest of the plant facility by a pipeline that is generally less than 15 miles in distance. The on-site fuel synthesis reactor may supply various feedback parameters and other request to the control system. For example, the on-site fuel synthesis reactor can request the control system to alter the H2 to CO ratio of the synthesis gas coming out of the two reactors portion of the plant and the control system will do so.

Overall, the two control systems interaction with the chemical composition sensors are configured to control 1) changes in a flow rate of a biomass particles being fed into the high-radiant heat-flux reactor, 2) provides feedback to change a flow rate of natural gas and steam into the SMR reactor, 3) directs the one or more regenerative heaters to increase their heat input into the high-radiant heat-flux reactor, 4) directs an increase in steam flow into the high-radiant heat-flux reactor, and 4) any combination of the four.

In an embodiment, the synthesis gas from the biomass gasification reaction maintained by the control system can have total tar concentrations below 200 mg Nm-3, catalyst poison concentrations below 100 ppb for H2S, HCL, and NH3, and have a H2:CO ratio within the example range 2.3 to 2.7. These compositional concentration measurements can be taken periodically during gasifier operation through FTIR spectroscopy and gas chromatography periodically and measured with other detectors on a steady state basis. These parameters may be fed to the control system to ensure that synthesis gas composition does not vary (+/−10%) from the desired composition, as well as to verify that catalyst poison concentrations are not above deactivation thresholds for the methanol synthesis catalyst. Ash measurements can be made one or more times daily and mass balances can be performed to ensure that overall biomass conversion remains above threshold targets and that alkali deposits are not being formed on the inside of the reactor.

In an embodiment, the integrated plant also contains the biomass particle feed system to grind, pulverize, shear and any combination of the three biomass to a particle size controlled to an average smallest dimension size between 50 microns (um) and 2000 um. The biomass feed system may supply a variety of non-food stock biomass sources fed as particles into the high-radiant heat-flux reactor. The variety of non-food stock biomass sources can include two or more types of biomass that can be fed, individually or in combinational mixtures. Some examples of non-food stock biomass sources include rice straw, corn stover, switch grass, soft woods, hard woods, non-food wheat straw, miscanthus, orchard wastes, forest thinnings, forestry wastes, energy crops, source separated green wastes and other similar biomass sources. The biomass sources can be in a raw state or in a partially torrefied state, as long as a few parameters, including particle size of the non-food stock biomass and operating temperature range of the reactor tubes are controlled.

The integrated plant also contains the methanol synthesis reactor train 276. Methanol is a chemical with formula CH3OH (often abbreviated MeOH). It is the simplest alcohol, and is a flammable fuel and can be stored as a liquid at normal temperatures. In one example of methanol synthesis in the methanol synthesis reactor train 276, the carbon monoxide, carbon dioxide, and hydrogen in the supplied synthesis gas react on a catalyst to produce methanol. A widely used catalyst is a mixture of copper, zinc oxide, and alumina. As an example, at 5-10 MPa (50-100 atm) and 250° C., it can catalyze the production of methanol from the carbon oxides and hydrogen with high selectivity according to the overall reaction:

$$CO + 2H_2 \rightarrow CH_3OH$$

The methanol synthesis consumes 2 moles of hydrogen gas for every mole of carbon monoxide. One way of dealing with the excess hydrogen if it exists is to inject carbon dioxide into the methanol synthesis reactor, where it, too, reacts to form methanol according to the overall equation:

$$CO_2 + 3H_2 \rightarrow CH_3OH + H_2O,$$

Alternatively, as discussed above excess H2 in the methanol synthesis process can be recirculated back to the H2 gas ballast tank.

In an embodiment a methanol synthesis unit may comprise a standard shell and tube Lurgi style methanol reactor. The general process and operation is well-known with a few modifications for the integrated plant. The process operates at a 4:1 recycle ratio and converts 96% of the synthesis gas to methanol. The process may also operate at another example 7.5:1 recycle ratio and conversion of 95% of the synthesis gas to methanol. The Lurgi style methanol synthesis reactor uses a boiling water shell packed tube with a Cu/ZnO/Al2O3 catalyst. The exothermic heat of reaction can be removed by boiling water on the shell side of the reactor. The product methanol then passes through a heat exchanger to preheat the feed stream and two additional heat exchangers in order to bring the temperature to an appropriate level for separations (66° C.). The product stream then enters a flash drum, where the un-reacted synthesis gas can be separated from the raw methanol and water products. Some of the un-reacted synthesis gas is purged (as it contains some inert CO2 not removed by the amine system, which would build up in the system) and it can be recompressed by a bank of three recycle compressors. The synthesis gas produced by the biomass gasifier is principally comprised of hydrogen, carbon monoxide, and some (~5%) carbon dioxide, methane, other hydrocarbons, and water. The raw methanol is distilled from the entrained water product and fed to the methanol-to-gasoline (MTG) unit 282, where the methanol is converted to gasoline and LPG.

FIG. 2B illustrates a block diagram of an embodiment of an example integrated process flow for the reactor and its associated plant. In an embodiment, the integrated process with the ultra-high heat flux chemical reactor has several major process steps: including the following.

Figure 4:
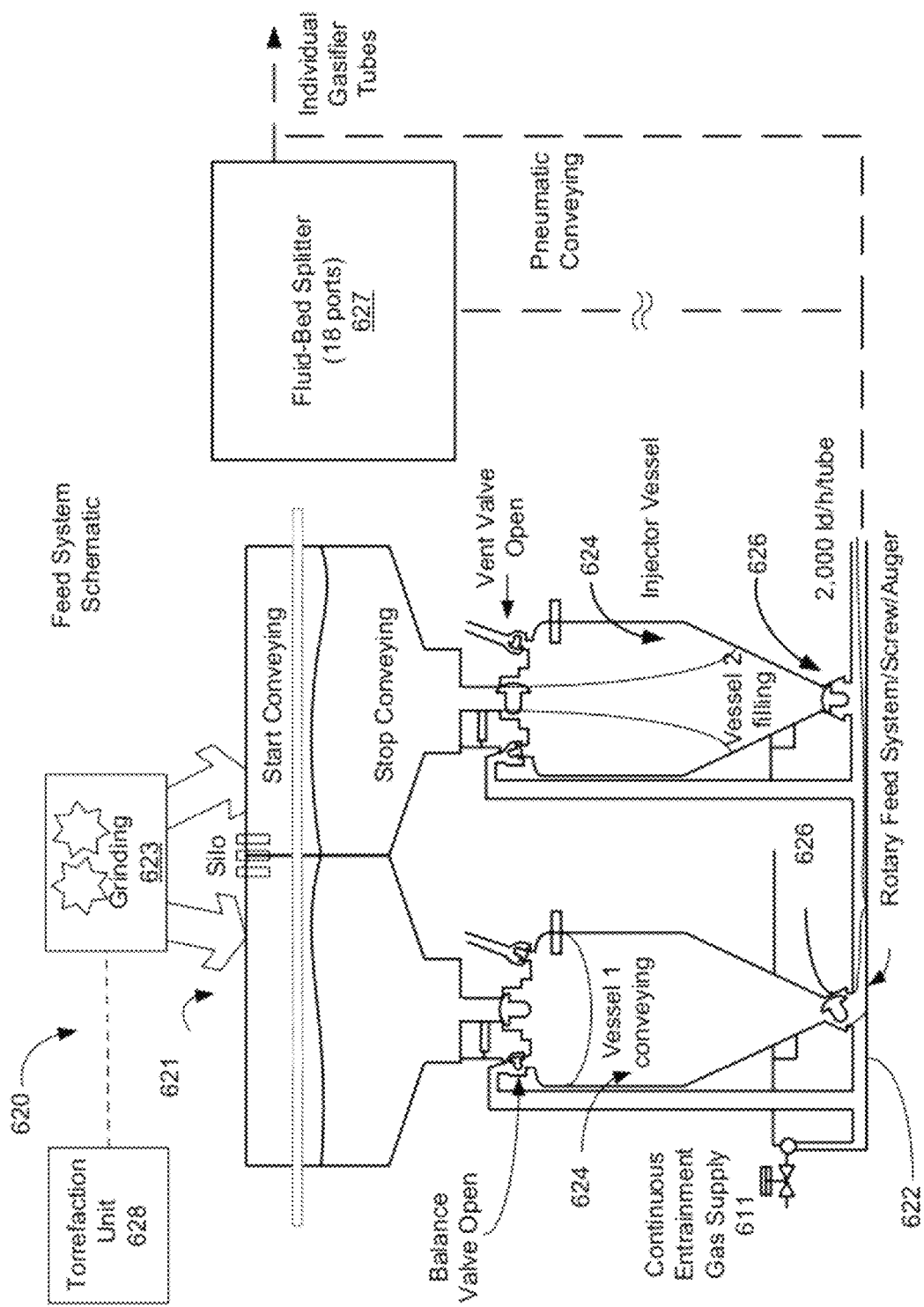
FIG. 4 illustrates embodiments for an entrained-flow biomass feed system that supplies the biomass particles in a carrier gas to the high-radiant heat-flux reactor.

As discussed, the integrated plant also contains feed stock systems into the high heat flux chemical reactor 814 and the SMR 808. Chemical reactant(s) preparation 860 occurs with subsequent feeding into the ultra-high heat flux chemical reactor 814. For example, this may include torrefaction of the biomass, biomass grinding or densification, transport and offload, storage, and feeding 864. FIG. 4 goes into a little more detail on these process steps.

A heat source is used to drive the reactions in the SMR as well as in the ultra-high heat flux chemical reactor 814. A combination of steam and regenerative heaters may be used an example heat source.

Each set of regenerative burners may work as follows. Regeneration uses a pair of burners, which cycle to alternately heat the combustion air or recover and store the heat from the furnace exhaust gases. When one regenerative burner is firing, the other is exhausting the furnace gases. Exhaust gases pass through the regenerative burner body and into a media case, which contains refractory material. The refractory media is heated by the exhaust gases, thus recovering and storing energy from the flue products. When the media bed is fully heated, the regenerative burner currently firing is turned off and begins to exhaust the flue products. The regenerative burner with the hot media bed begins firing. Combustion air passes through the media bed and is heated by the hot refractory. Air preheat temperatures within 300 degrees F.-500 degrees F. of the furnace temperature are achieved resulting in exceptionally high thermal efficiency.

In a solar embodiment, various heliostat field designs and operations drive the high radiant heat flux. Some example designs may include a solar concentrator, secondary concentrator, focused mirror array, etc. to drive high radiant heat flux reactor 814.

The biomass particles are thermally decomposed in the high radiant heat flux reactor 814 into ash, syngas components, and other products.

Quenching, gas clean up, and ash removal from biomass high radiant heat flux reactor 814 may be provided for at, for example, 868. Some non-pilot syngas may exit the system in addition to waste heat, which may be recuperated at 872. Some gasses may be a waste product, while other gasses can be compressed 874 prior to storage 878 or e.g., methanol synthesis 876. Methanol may then be stored 880 for later methanol to gasoline conversion 882.

In one embodiment, exit gasses from the high heat flux chemical reactor 814 may be fed to SMR 808 prior to quenching 809. In another embodiment, gasses may be fed to SMR some amount of quenching, gas clean up, and ash removal in 868. While still another embodiment might do these in combination. Thus, methane ($CH_4$) generated in the biomass gasification may be supplied along with the syngas components to feed the SMR reactor.

After the chemical reaction in the high-radiant heat-flux reactor occurs, then rapid cooling occurs to capture the molecular state of the reaction products. A quench zone 809 is located immediately downstream of an exit of the high-radiant heat-flux reactor 114 to immediately quench via rapid cooling of at least the hydrogen and carbon monoxide of the reaction products of exiting the high-radiant heat-flux reactor 114. This achieves within 10 seconds a temperature after quenching of 800 degrees C. or less, which is below a level to reduce coalescence of ash remnants of the biomass particles and a reformation reaction of the carbon monoxide and hydrogen into larger molecules. The cooling generally occurs to preferably equal to or less than 400 degrees C. within the 10 seconds of exiting the high-radiant heat-flux reactor 114. At the exit of the gasification reaction zone in the reactor tubes of the high-radiant heat-flux reactor 114, two or more of the multiple reactor tubes form into a group at the exit and that group combines their reaction products and un-reacted particles from the biomass gasification into a larger pipe per group that forms a portion of the quench zone. One or more sprayers inside the larger pipe inject a cooling fluid directly into the reaction product syngas stream to make the temperature transition from the at least 900 degree C. exit temperature to less than the 400 degrees C. within the 0.1-10 seconds to prevent metal dusting corrosion of the pipe walls.

A sulfur removal sorbent, present in either the biomass gasification process or initially introduced in the quench zone, reduces an amount of sulfur present in a syngas stream exiting the quench zone in the gas clean up section 868. One or more hot particle filters to remove particulates from the syngas stream exiting the quench zone, where the particulates are sent to an ash-holding vessel. The products from the chemical reaction are supplied to a downstream chemical synthesis plant.

In an embodiment, hydrogen gas from a purge loop of the methanol-synthesis-reactor-train is recycled into a syngas component feed. The hydrogen gas is recycled back to 1) a suction of the methanol-synthesis-reactor-train, 2) the ballast tank to be stored in the ballast tank, 3) a heater unit fed as fuel to the one or more regenerative burners or steam heaters, and 4) any combination of the three. Additionally, Next, methane ($CH_4$) recovered from the methanol synthesis 876 may be supplied back to the SMR. This provides a way to deal with methane generated in biomass gasification process. The SMR reformer may then use a catalyst on the methanol purge stream to convert purged $CH_x$ gases to syngas or $H_2$. This can improve the yield and molecular weight of the produced methanol ($CH_3OH$) from the methanol synthesis reactor. The methanol purification reactor may be designed to provide fuel grade methanol to the MTG unit. This creates more carbon credits. In an example embodiment, a one tower distillation system may be used with the methanol synthesis reactor.

In an embodiment, gasoline is produced from the integrated plant. In various other embodiments, synthesis gas may be feed to another technical application. Examples include a syngas to other chemical conversion process. The other chemical of chemicals produced can include liquefied fuels such as transportation liquefied fuels. Some transportation liquefied fuels include jet fuel, DME, gasoline, diesel, and mixed alcohol, bio-char with a high sequestered amount of carbon; chemical production, electricity generation, synthetic natural gas production, heating oil generation, and other similar syngas based technical applications. In an example hydrocarbon based fuel, e.g., methanol, 876 may be formed from syngas. The methanol may be further converted to gasoline or other fuels 882 and various products may be separated out from the gasoline 884 or syngas. These products, e.g., gasoline, may then be stored for later use as an energy source.

If an intermediate chemical was produced from the ultra-high heat flux chemical reactor, that resultant product may be fed to other processes in the integrated plant. For example, a synthesis gas may be fed to a technical application. These technical applications include syngas to a transportation liquefied fuels such as jet fuel, DME, gasoline, diesel, methanol, and mixed alcohol, bio-char with a high sequestered amount of carbon; chemical production, electricity generation, synthetic natural gas production; heating oil generation; and other similar syngas based technical applications.

Referring to FIG. 1, in an embodiment, one or more heat transfer aids may be used to heat the chemical reactant gases. The heat transfer aid may be one or more of the following flowing particulates in the biomass particulate stream and/or structured packing located inside each reactor tube in the high-radiant heat-flux reactor. These heat radiation absorbing materials act as heat transfer aids that can be used in the reactor tubes to increase heat transfer to reactant gases and other materials (operating at 20-50 times the heat flux of conventional gas phase chemical reactors). Radiation is the primary mode of heat transfer to the heat transfer aids from the reactor tube walls, and conduction, convection, or some combination of the two are the secondary modes of heat transfer from the cavity walls and reactor tubes. Additionally, heat transfer aid for reactions in the SMR reactor includes one or more of: (1) a fluidized bed or entrained flow of biomass particles, (2) a fluidized bed or entrained flow of chemically inert particles, (3) a ceramic monolith, (4) ceramic tubes or aerogels, (5) open structured packed rings including (a) Raschig rings, (b) gauze, (c) reticulate porous ceramic (RPC) foam, or (d) wire constructed of a high temperature-resistant material. The SMR reactor may also include a catalytic lining to aid reaction kinetics.

Note, the reactor tubes serve the dual functions of 1) segregating the biomass gasification reaction environment from the atmosphere of the receiver cavity and 2) transferring energy by radiation absorption and heat radiation, convection, and conduction to the reacting particles of biomass to drive the endothermic gasification reaction of the particles of biomass flowing through the reactor tubes. The high heat transfer rates of the reactor tubes and cavity walls allow the particles of biomass to achieve a high enough temperature necessary for substantial tar destruction and gasification of greater than 90 percent of the biomass particles into reaction products including the hydrogen and carbon monoxide gas in a very short residence time between a range of 0.01 and 5 seconds.

The ultra-high heat fluxes driven by the high operating temperatures can be suitable for driving a variety of commercially desirable reactions including: Biomass gasification; Coal gasification; Steam methane reforming; Dry methane reforming; Ethylene pyrolysis, ethylene dichloride cracking (pyrolysis); Naphtha cracking, ethane cracking; Carbon black production via methane cracking; Hydrogen production via metal ferrite redox cycles; and other similar reactions.

Note, biomass gasification is an endothermic process. Energy must be put into the process to drive it forward. Typically, this is performed by partially oxidizing (burning) the biomass itself. Between 30% and 40% of the biomass must be consumed to drive the process, and at the temperatures which the process is generally limited to (for efficiency reasons), conversion is typically limited, giving still lower yields. A typical theoretical gasoline yield for a standard gasification process is 50 gallons of gasoline/ton of biomass. The ultra-high heat flux high-radiant heat-flux reactor 114 process uses an external source of energy (such as concentrated solar energy) to provide the energy required for reaction, so none of the biomass need be consumed to achieve the conversion. This results in significantly higher yields (100 gallons of gasoline per ton). As the energy source being used to drive the conversion is renewable and carbon free, (in the case of concentrated solar energy) it is eligible for carbon credits and/or will not be adversely affected by carbon penalties in the future.

Figure 3:
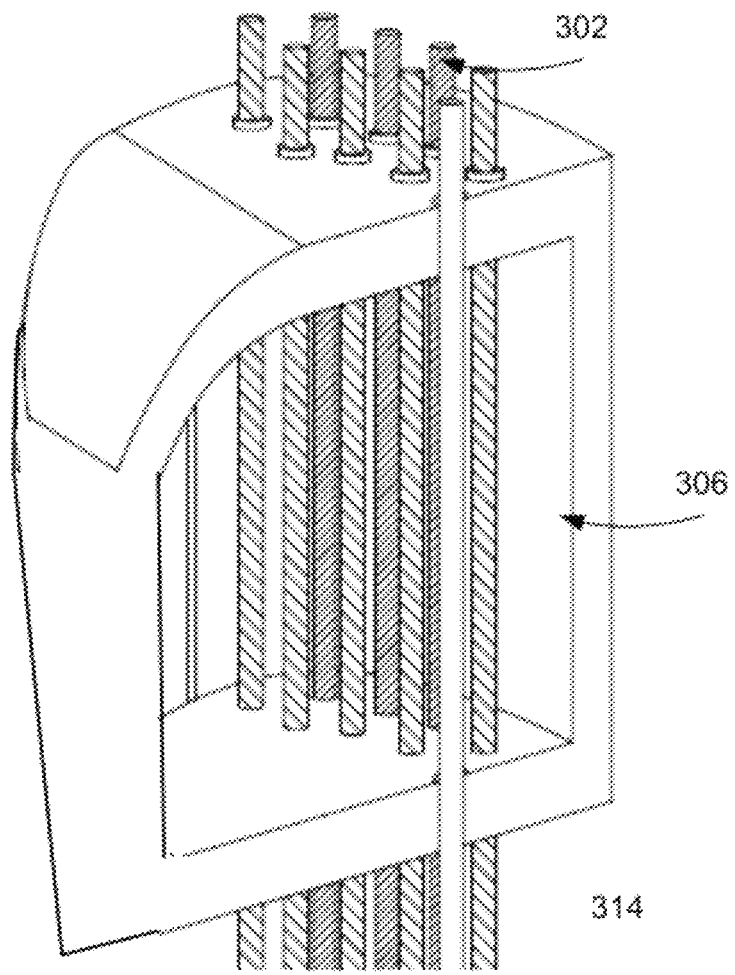
FIG. 3 illustrates a cut away view of an embodiment for the receiver cavity enclosing offset and staggered reactor tubes in an embodiment of the high-radiant heat-flux reactor.

FIG. 3 illustrates a cut away view of an embodiment for the receiver cavity enclosing offset and staggered reactor tubes. The thermal receiver 306 has a cavity with an inner wall. The radiation driven geometry of the cavity wall of the thermal receiver 306 relative to the reactor tubes 302 locates the multiple tubes 302 of the chemical reactor as offset and in a staggered arrangement inside the receiver 306. A surface area of the cavity walls is greater than an area occupied by the reactor tubes 302 to allow radiation to reach areas on the tubes 302 from multiple angles. The inner wall of the receiver 306 cavity and the reactor tubes 302 exchange energy primarily by radiation, with the walls and tubes 302 acting as re-emitters of radiation to achieve a high radiative heat flux reaching all of the tubes 302, and thus, avoid shielding and blocking the radiation from reaching the tubes 302, allowing for the reactor tubes 302 to achieve a fairly uniform temperature profile from the start to the end of the reaction zone in the reactor tubes 302.

Thus, the geometry of the reactor tubes 302 and cavity wall shapes a distribution of incident radiation with these 1) staggered and offset tubes 302 that are combined with 2) a large diameter cavity wall compared to an area occupied by the enclosed tubes 302, and additionally 3) combined with an inter-tube radiation exchange between the multiple reactor tube geometric arrangement relative to each other where the geometry. The wall is made of material that highly reflects radiation or absorbs and re-emits the radiation. The shaping of the distribution of the incident radiation uses both reflection and absorption of radiation within the cavity of the receiver 306. Accordingly, the inner wall of the thermal receiver 306 is aligned to and acts as a radiation distributor by either 1) absorbing and re-emitting radiant energy, 2) highly reflecting the incident radiation to the tubes 302, or 3) any combination of these, to maintain an operational temperature of the enclosed ultra-high heat flux chemical reactor. The radiation from the 1) cavity walls, 2) directly from the regenerative burners, and 3) from an outside wall of other tubes acting as re-emitters of radiation is absorbed by the reactor tubes 302, and then the heat is transferred by conduction to the inner wall of the reactor tubes 302 where the heat radiates to the reacting particles and gases at temperatures between 900 degrees C. and 1600 degrees C., and preferably above 1100 degrees C.

As discussed, the inner wall of the cavity of the receiver 306 and the reactor tubes 302 exchange energy between each other primarily by radiation, not by convection or conduction, allowing for the reactor tubes 302 to achieve a fairly uniform temperature profile even though generally lower temperature biomass particles and entrainment gas enter the reactor tubes 302 in the reaction zone from a first entrance point and traverse through the heated cavity to exit the reaction zone at a second exit point. This radiation heat transfer from the inner wall and the reactor tubes 302 drives the chemical reaction and causes the temperature of the chemical reactants to rapidly rise to close to the temperature of the products and other effluent materials departing from the exit of the reactor.

A length and diameter dimensions of a gasification reaction zone of each of the reactor tubes 302 is sized to give the very short residence time of 0.01 second to 5 second at the gasification temperatures of at least 900 degrees C., and an exit of the gasification zone in the multiple reactor tubes 302. The reaction products have a temperature from the exit of the gasification zone that equals or exceeds 900 degrees C., and the multiple reactor tubes 302 in this chemical reactor design increase available reactor surface area for radiative exchange to the biomass particles, as well as inter-tube radiation exchange. A rapid gasification of dispersed falling biomass particulates with a resultant stable ash formation occurs within a residence time within the reaction zone in the reactor tubes 302 in the less than 5 seconds, resulting in a complete amelioration of tar to less than 500 milligrams per normal cubic meter, and at least a 90 conversion of the biomass into the production of the hydrogen and carbon monoxide products.

The design reduces the required surface area of the reactor tubes 302 and furnace interior, thus reducing the size, weight, and cost of the furnace chamber (size & weight are important for tower-mounted solar applications as well as other applications).

The temperatures of operation, clearly delineated with wall temperatures between 1200° C. and 1450° C. and exit gas temperatures in excess of 900° C. but not above silica melting temperatures (1600° C.) is not typically seen in gasification, and certainly not seen in indirect (circulating fluidized bed) gasification. The potential to do co-gasification of biomass and steam reforming of natural gas which can be done in the ultra-high heat flux chemical reactor could not be done in a partial oxidation gasifier (as the methane would preferentially burn).

FIG. 4 illustrate embodiments for an entrained-flow biomass feed system that supplies the biomass particles in a carrier gas to the chemical reactor.

The entrained-flow biomass feed system 620 can include a pressurized lock hopper pair 624 that feeds the biomass to a rotating metering feed screw 622 and then into an entrainment gas pipe at the exit 626 of the lock hopper pair. The particles of the biomass are distributed into multiple entrainment gas lines by a flow splitter 627 to feed the two or more reactor tubes making up the chemical reactor.

In an embodiment, the high heat flux reactor and associated integrated system may also include the entrained-flow biomass feed system 620 having one or more lock-hopper pairs 624 equipped with a single multi-outlet feed splitter 627 that simultaneously feeds the particles of the biomass in pressurized entrainment gas lines into two or more tubes of the chemical reactor.

The high heat flux reactor and associated integrated system may also include a grinding system 623 and a torrefaction unit 628. The torrefaction unit exposes the biomass to lower temperatures 600 degrees C. and lower to pyrolyze the biomass. The grinding system 623 has a grinding device that is at least one of 1) a mechanical cutting device, 2) a shearing device, 3) a pulverizing device, and 4) any combination of these that breaks apart the biomass, and a series perforated filters in the entrained-flow biomass feed system. Equipment generally used for grinding biomass includes impact mills (e.g. hammer mills), attrition mills, and kinetic disintegration mills-KDS (e.g. flail mills). A hammer mill system, KDS, or similar system can be used to grind the bales (loaded by conveyer) into particles, which are to be fed into the radiant heat flux thermal gasifier. The grinding device and perforated filters grind the partially pyrolyzed biomass from the torrefaction unit 628 to control the particle size of the biomass. The ground particles have an average screen size between 500 microns (um) and 1000 um in diameter, and are loaded into, a silo with a standard belt conveyer or with a positive or negative pressure pneumatic conveying system. The ground particles may also have an average screen size between 1 micron (um) and 1000 um, 1 micron (um) and 200 um, 1 micron (um) and 2000 um and various combinations. Individual fibers of biomass may for example have average size on the order of 3 microns. The entrained-flow biomass feed system is feedstock flexible to be able to supply multiple different types of biomass without changing the feed or reactor process via at least particle size control of the biomass and that the energy source for the chemical reaction comes from an external source, rather than burning the biomass itself. The torrefaction unit 628 is geographically located on the same site as the ultra-high heat flux chemical reactor and configured to be subject the biomass to partial pyrolysis with recouped waste heat from the chemical reaction in a temperature range of up to 300 degrees C. to make the biomass 1) brittle and easier for grinding, 2) dryer, less sticky, and easier to feed in a conveying system, 3) subject to less spoilage issues in storage as a torrefied biomass, as well as 4) produce off gases from the torrefaction process. The torrefaction unit 628 supplies partially pyrolyzed biomass to the grinding system 623. The torrefaction of the partially pyrolyzed biomass reduces the energy required by the grinding device to grind the biomass to the controlled particle size. The off gases from the torrefaction of the biomass can be used for one or more of the 1) entrainment carrier gas, 2) an energy source for steam generation, or 3) a gas for the gas-fired regenerative burners.

The feedstock flexibility of being able to use multiple types of biomass without redesigning the feed and reactor process clearly gives an economic advantage over processes that are limited to one or a few available feed stocks. By heating the reactor tubes with radiant energy (which re-radiate to the particles), the problem of generating heat for the reaction and designing the reactor to conduct the reaction (essentially the endothermic/exothermic balancing problem) is eliminated.

Figure 5:
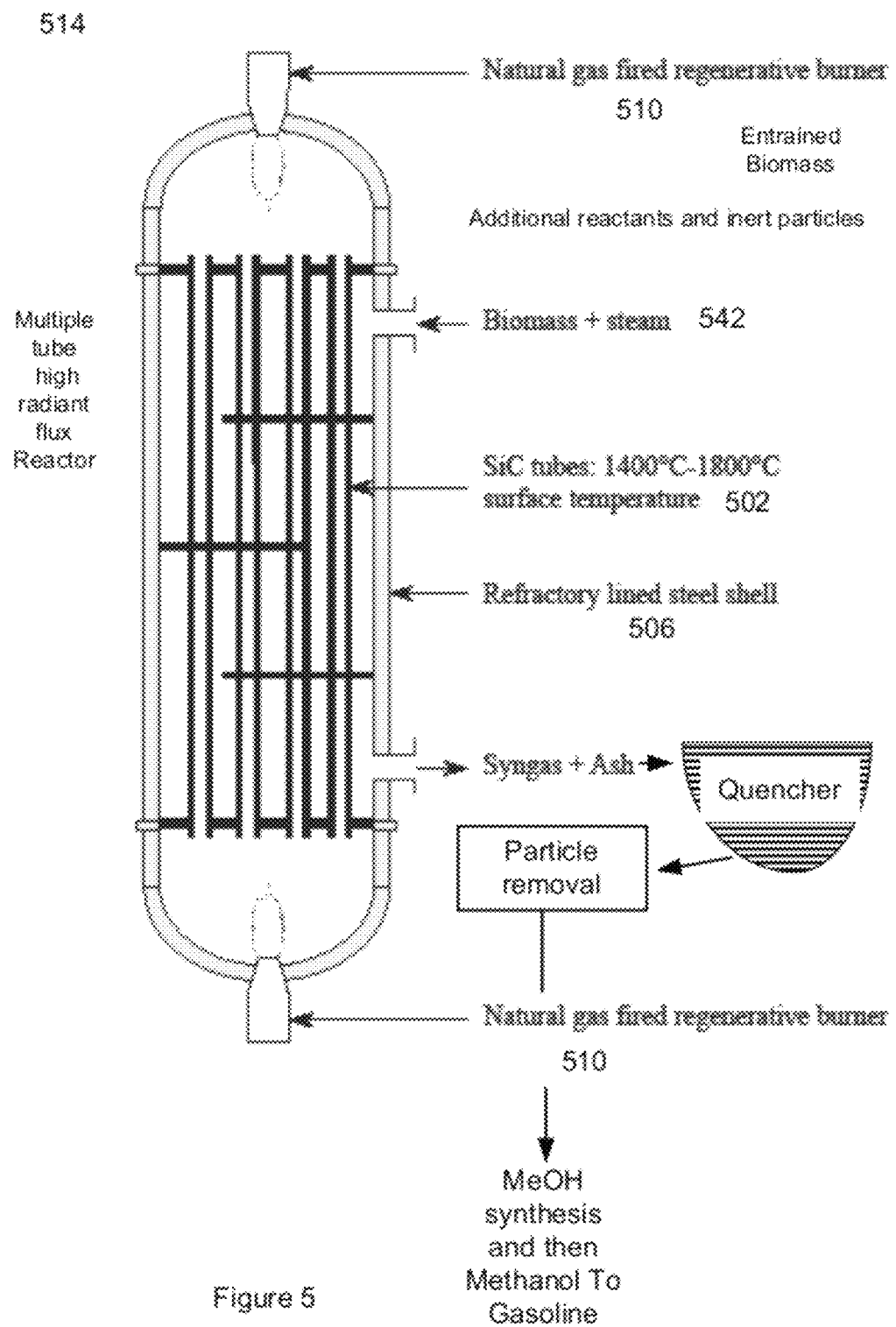
FIG. 5 illustrates a flow schematic of an embodiment for the radiant heat chemical reactor configured to generate chemical products including synthesis gas products.

FIG. 5 illustrates a flow schematic of an embodiment for the radiant heat chemical reactor configured to generate chemical products including synthesis gas products. The multiple shell radiant heat chemical reactor 514 includes a refractory vessel 506 having an annulus shaped cavity with an inner wall. The radiant heat chemical reactor 514 has two or more radiant tubes 502 made out of a solid material. The one or more radiant tubes 502 are located inside the cavity of the refractory lined vessel 506.

The exothermic heat source 510 heats a space inside the tubes 502. Thus, each radiant tube 502 is heated from the inside with an exothermic heat source 510, such as regenerative burners, at each end of the tube 502. Each radiant tube 502 is heated from the inside with fire and gases from the regenerative burners through heat insertion inlets at each end of the tube 502 and potentially by one or more heat insertion ports located in between the two ends. Flames and heated gas of one or more natural gas fired regenerative burners 510 act as the exothermic heat source supplied to the multiple radiant tubes at temperatures between 900° C. and 1800° C. and connect to both ends of the radiant tubes 502. Each tube 502 may be made of SiC or other similar material.

One or more feed lines 542 supply biomass and reactant gas into the top or upper portion of the chemical reactor 514. The feed lines 542 for the biomass particles and steam enter below the entry points in the refractory lined vessel 506 for the radiant tubes 502 that are internally heated. The feed lines 112 are configured to supply chemical reactants including 1) biomass particles, 2) reactant gas, 3) steam, 4) heat transfer aid particles, or 5) any of the four into the radiant heat chemical reactor. A chemical reaction driven by radiant heat occurs outside the multiple radiant tubes 502 with internal fires. The chemical reaction driven by radiant heat occurs within an inner wall of a cavity of the refractory lined vessel 506 and an outer wall of each of the one or more radiant tubes 502.

The chemical reaction may be an endothermic reaction including one or more of 1) biomass gasification ($CnHm + H2O \rightarrow CO + H2 + H2O + X$), 2) and other similar hydrocarbon decomposition reactions, which are conducted in the radiant heat chemical reactor 514 using the radiant heat. A steam ($H2O$) to carbon molar ratio is in the range of 1:1 to 1:4, and the temperature is high enough that the chemical reaction occurs without the presence of a catalyst.

The torrefied biomass particles used as a feed stock into the radiant heat reactor design conveys the beneficial effects of increasing and being able to sustain process gas temperatures of excess of 1300 degrees C. through more effective heat transfer of radiation to the particles entrained with the gas, increased gasifier yield of generation of syngas components of carbon monoxide and hydrogen for a given amount of biomass fed in, and improved process hygiene via decreased production of tars and C2+ olefins. The control system for the radiant heat reactor matches the radiant heat transferred from the surfaces of the reactor to a flow rate of the biomass particles to produce the above benefits.

The control system controls the gas-fired regenerative burners 510 to supply heat energy to the chemical reactor 514 to aid in causing the radiant heat driven chemical reactor to have a high heat flux. The inside surfaces of the chemical reactor 514 are aligned to 1) absorb and re-emit radiant energy, 2) highly reflect radiant energy, and 3) any combination of these, to maintain an operational temperature of the enclosed ultra-high heat flux chemical reactor 514. Thus, the inner wall of the cavity of the refractory vessel and the outer wall of each of the one or more tubes 502 emits radiant heat energy to, for example, the biomass particles and any other heat-transfer-aid particles present falling between an outside wall of a given tube 502 and an inner wall of the refractory vessel. The refractory vessel thus absorbs or reflects, via the tubes 502, the concentrated energy from the regenerative burners 510 positioned along on the top and bottom of the refractory vessel to cause energy transport by thermal radiation and reflection to generally convey that heat flux to the biomass particles, heat transfer aid particles and reactant gas inside the chemical reactor. The inner wall of the cavity of the thermal refractory vessel and the multiple tubes 502 act as radiation distributors by either absorbing solar radiation and re-radiating it to the heat-transfer-aid particles or reflecting the incident radiation to the heat-transfer-aid particles. The radiant heat chemical reactor 514 uses an ultra-high heat flux and high temperature that is driven primarily by radiative heat transfer, and not convection or conduction.

Figure 6:
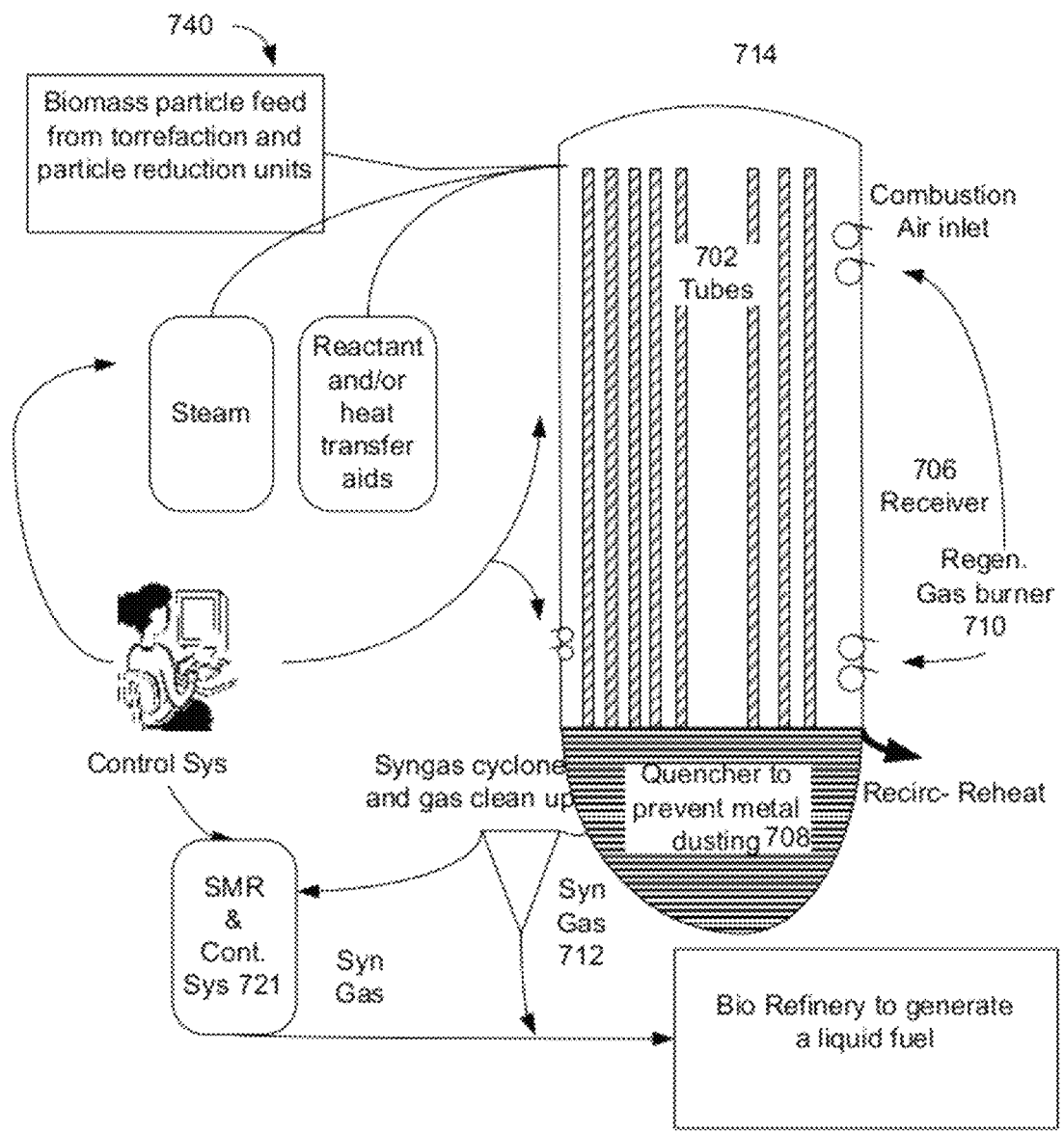
FIG. 6 illustrates a diagram of an embodiment of a high heat flux driven bio-refinery with multiple control systems that interact with each other.

FIG. 6 illustrates a diagram of an embodiment of the integrated multiple zone bio-refinery with multiple control systems that interact with each other. In such a system, radiant heat energy may be provided to the chemical reactor 714. In this example, the chemical reactor may be heated by two or more sets of the gas-fired regenerative burners 710.

An entrainment carrier gas system supplies carrier gas for the particles of biomass in the feed system to the chemical reactor. The other chemical reactants, heat transfer aid particles, oxygen, and/or steam may also be delivered to the radiant tubes. As illustrated, chemical reactants, including biomass particles, may flow into the chemical reactor 702 and syngas flows out 712. The quench unit 709 may be used to rapidly cool the reaction products and prevent a back reaction into larger molecules.

The computerized control system may be multiple control systems that interact with each other. The computerized control system for the high-radiant heat-flux reactor is configured to send a feed demand signal to feed system's to control an amount of 1) radiant tube sets to be fed particles of biomass in the chemical reactor, 2) amount of gas fired regenerative burners supplying heat, 3) rate at which particular gas fired regenerative burners supply heat, and 4) any combination of these based on control signals and the temperature measured for the chemical reactor. The control system may rely on feedback parameters including temperature of the reactor as well as feed forward parameters including anticipated changes in heat in from the burners and heat out from changes in an amount of chemical reactants and carrier gas being passed through the radiant tubes 702.

In general, the high heat transfer rates of the radiant tubes and cavity walls maintained by the control system allow the particles of biomass to achieve a high enough temperature necessary for substantial tar destruction and gasification of greater than 90 percent of the biomass particles into reaction products including the hydrogen and carbon monoxide gas in a very short residence time between a range of 0.01 and 5 seconds.

The gasifier reactor control system keeps the reaction temperature in the chemical reactor high enough based on temperature sensor feedback to the control system to avoid the need for any catalyst to cause the chemical reaction occurring within the chemical reactor but allowing the temperature at or near the exit to be low enough for a hygiene agent supply line to inject hygiene agents to clean up the resultant product gas by removing undesirable compositions from the resultant product gas, promote additional reactions to improve yield, and any combination of these two, all while keeping the exit temperature of the chemical reactor greater than 900 degree C. to avoid tar formation in the products exiting the chemical reactor.

The gasifier reactor control system may be configured to maintain the reaction temperature within the chemical reactor based upon feedback from a temperature sensor at least 1200 degrees C. to eliminate the need for a catalyst for the chemical reactions as well as overdrive the endothermic reactions including the steam methane reforming and the steam ethane reforming, which are equilibrium limited; and thereby improve the equilibrium performance for the same amount of moles of reactant feedstock, to increase both yield of resultant gaseous products and throughput of that reactant feedstock.

The SMR control system 721 interacts with the SMR to alter a flow of the methane-based gas and steam through the SMR reactor to control a volume of syngas components being produced.

The SMR reactor control system interacts with the gasifier reactor control system to supply a proper hydrogen-to-carbon monoxide ratio of synthesis gas composition feed necessary for high quality methanol synthesis, which is a 2:1 to 3:1 hydrogen-to-carbon monoxide ratio and preferably a ratio of 2.3 to 3.0:1. The methanol-synthesis-reactor-train coupled downstream of the SMR reactor and the high-radiant heat-flux reactor receives a first stream of the syngas components from the SMR reactor and a separate second stream of the syngas components from the high-radiant heat-flux reactor. The SMR reactor control system interacts with the gasifier reactor control system based on the chemical composition feedback from the first and second set of chemical composition sensors to produce the high quality syngas mixture for methanol synthesis.

The control system for the torrefaction unit, catalytic converters and biomass gasifier control the ratio and content of the syngas going to the methanol synthesis reactor and interact with the other control systems in the integrated plant.

The control systems of the reactor and liquid fuel plant 720, such as a Methanol to Gasoline synthesis plant, may have bi-directional communications between the chemical reactor and the liquid fuel plant, such as a methanol plant. For example, when a subset of tubes needs to be adjusted out for maintenance or due to a failure, then the integrated plant can continue to operate with increase biomass and entrainment gas flow through the chemical reactor to keep a steady production of syngas for conversion into a liquid fuel. Changing entrainment gas pressure in the radiant tubes can also be used to increase/decrease the heat sink effect of the biomass and gas passing through the tubes.

The control system has algorithms and operational routines established to tolerate transient flow of syngas operation if the heat source is a solar heat source.

The control system may control the chemical reactions occurring within the reactor tubes via a number of mechanisms. For example, the flow rate of the chemical reactants, such as biomass particles and carrier gas, into and through the reactor tubes is controlled, along with a concentration of each reactant flowing through the reactor tube. The control system may control each reactor tube individually, or in sets/groups of for example clusters of eighteen tubes, or all of the tubes in their entirety.

Next, the various algorithms and processes for the control system may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. In general, the program modules may be implemented as software instructions, Logic blocks of electronic hardware, and a combination of both. The software portion may be stored on a machine-readable medium and written in any number of programming languages such as Java, C++, C, etc. The machine readable medium may be a hard drive, external drive, DRAM, Tape Drives, memory sticks, etc. Therefore, the component parts, such as the transaction manager, etc. may be fabricated exclusively of hardware logic, hardware logic interacting with software, or solely software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, the recuperated waste heat from various plant processes can be used to pre-heat combustion air, or can be used for other similar heating means. Regenerative gas burners or conventional burners can be used as a heat source for the furnace. The source of the radiant heat may be one or more of 1) solar energy, 2) gas-fired regenerative burners, 3) nuclear power, 4) electric heaters and 5) any combination of these four. The high radiant heat flux reactor may be used as a biomass gasifier but other types of biomass gasifier are useable as well. The high radiant heat flux reactor can be used for any type of endothermic reaction in any aspect of the chemical industry discussed herein. Biomass gasifier reactors other than a radiant heat chemical reactor may be used. The Steam Methane Reforming may be/include a SHR (steam hydrocarbon reformer) that cracks short-chained hydrocarbons (<C20) including hydrocarbons (alkanes, alkenes, alkynes, furans, phenols, carboxylic acids, ketones, aldehydes, ethers, etc, as well as oxygenates into syngas components. The invention is to be understood as not limited by the specific embodiments described herein, but only by scope of the appended claims.

The invention claimed is:

1. A multiple stage synthesis gas generation system, comprising:
a radiant high heat-flux reactor configured to receive biomass particles that undergo a biomass gasification reaction in the reactor at greater than 950 degrees C., via primarily due to a radiant heat emitted from the radiant high heat-flux reactor, to produce reactant products including ash and syngas components of hydrogen and carbon monoxide coming out of an exit of the radiant high heat-flux reactor;
a hydrocarbon reforming reactor configured to receive a methane-based gas, where the hydrocarbon reforming reactor is in parallel to and cooperates with the radiant high heat-flux reactor to produce a high quality syngas mixture for organic liquid product synthesis between the resultant reactant products coming from the two reactors, wherein the hydrocarbon reforming reactor provides 1) hydrogen gas, 2) a hydrogen-rich syngas composition, in which a ratio of hydrogen-to-carbon monoxide is higher than a ratio generally needed for organic liquid product synthesis, or 3) any combination of the two, to be mixed with a potentially carbon-monoxide-rich syngas composition, in which a ratio of carbon monoxide to hydrogen is higher than the ratio generally needed for organic liquid product synthesis, from the radiant high heat-flux reactor to provide a required hydrogen-to-carbon monoxide ratio for organic liquid product synthesis;
a common input into an organic liquid product-synthesis-reactor-train coupled downstream of the hydrocarbon reforming reactor and the radiant high heat-flux reactor that is configured to receive a first stream of the syngas components from the hydrocarbon reforming reactor and a separate second stream of the syngas components from the radiant high heat-flux reactor, where one or more control systems monitor a chemical composition feedback signal of the first stream of the syngas components and the second stream of the syngas components from one or more sensors to produce a high quality syngas mixture for organic liquid product synthesis; and
where the hydrocarbon reforming reactor is a Steam Methane Reformer (SMR), where the radiant high heat-flux reactor has a biomass particle feed system, a first steam supply inlet, a first set of sensors to measure a chemical composition of produced product gases from the radiant high heat-flux reactor, and a gasifier reactor control system to cause the biomass gasification reaction of the biomass particles at greater than 950 degrees C., the SMR reactor has a methane-based gas feed system, a second steam supply inlet, a second set of sensors to measure a chemical composition of produced product gases from the SMR reactor, and an SMR control system, and both the SMR control system and the gasifier reactor control system are part of the one or more control systems, where the organic liquid product synthesis is methanol synthesis, and the common input into the methanol-synthesis-reactor-train is also configured to receive gases from a purge line exiting the methanol-synthesis-reactor-train, wherein the gasifier reactor control system and the SMR control system interact to control an amount of hydrogen and carbon monoxide gases supplied to the methanol-synthesis-reactor-train to achieve a proper hydrogen/carbon monoxide ratio for methanol synthesis from 1) the first stream of the syngas components from the SMR reactor, 2) the separate second stream of the syngas components from the radiant high heat-flux reactor and 3) a flow of hydrogen gas from a separator off a purge gas line coming out of the methanol-synthesis-reactor-train, and any of these three sources are mixed together prior to feeding the syngas at the proper ratio into the methanol-synthesis-reactor-train.

* * * * *